United States Patent
Geneste

(10) Patent No.: US 9,611,026 B2
(45) Date of Patent: Apr. 4, 2017

(54) STRATOSPHERIC BALLOON HAVING IMPROVED COMPRESSIVE STRENGTH

(71) Applicant: AIRBUS GROUP SAS, Paris (FR)

(72) Inventor: Jean-Francois Geneste, Toulouse (FR)

(73) Assignee: AIRBUS GROUP SAS, Blagnac (FR)

( * ) Notice: Subject to any disclaimer, the term of this patent is extended or adjusted under 35 U.S.C. 154(b) by 0 days.

(21) Appl. No.: 14/407,442

(22) PCT Filed: Jun. 14, 2013

(86) PCT No.: PCT/EP2013/062356
§ 371 (c)(1),
(2) Date: Dec. 11, 2014

(87) PCT Pub. No.: WO2013/189849
PCT Pub. Date: Dec. 27, 2013

(65) Prior Publication Data
US 2015/0151826 A1 Jun. 4, 2015

(30) Foreign Application Priority Data

Jun. 20, 2012 (FR) ...................................... 12 55761

(51) Int. Cl.
*B64B 1/58* (2006.01)
*B64B 1/60* (2006.01)
*B64B 1/62* (2006.01)
*B64B 1/40* (2006.01)

(52) U.S. Cl.
CPC .................. *B64B 1/58* (2013.01); *B64B 1/40* (2013.01); *B64B 1/60* (2013.01); *B64B 1/62* (2013.01)

(58) Field of Classification Search
CPC .... B64B 1/08; B64B 1/06; B64B 1/58; B64B 1/60; B64B 1/40; A63H 2027/1075; A63H 27/10; B64G 69/008; E04H 15/20; E04H 2015/201
USPC ................................................. 52/2.13, 2.18
See application file for complete search history.

(56) References Cited

U.S. PATENT DOCUMENTS

| 5,023,118 | A | | 6/1991 | Cheng | |
|---|---|---|---|---|---|
| 5,269,623 | A | * | 12/1993 | Hanson | E01F 7/00 256/13.1 |
| 5,311,706 | A | * | 5/1994 | Sallee | E04C 3/005 52/2.18 |
| 5,697,579 | A | * | 12/1997 | Hayashi | B64B 1/40 244/128 |
| 5,743,786 | A | | 4/1998 | Lindsey | |

(Continued)

FOREIGN PATENT DOCUMENTS

| FR | 2584762 A1 * | 1/1987 | ............ E04H 15/20 |
|---|---|---|---|
| GB | 299359 A | 4/1929 | |

(Continued)

*Primary Examiner* — Tien Dinh
*Assistant Examiner* — Alexander V Giczy
(74) *Attorney, Agent, or Firm* — Im IP Law; C. Andrew Im

(57) ABSTRACT

A three-dimensional structural framework having inflatable rings and a T-shaped cross-section along a plane passing through an axis of revolution of the inflatable rings in an inflated state. Shape-stabilizing elements are provided to stabilize the shape of the structural framework in space. Two inflatable rings are connected by at least one shape-stabilizing element. The structural framework is preferably used to produce stratospheric balloons.

7 Claims, 3 Drawing Sheets

(56) References Cited

U.S. PATENT DOCUMENTS

| | | | | |
|---|---|---|---|---|
| 6,108,980 A | * | 8/2000 | Braun | E04H 15/20 |
| | | | | 135/136 |
| 6,463,699 B1 | * | 10/2002 | Bailey | E04C 3/005 |
| | | | | 138/115 |
| 6,877,693 B1 | * | 4/2005 | Barbarie | B64B 1/06 |
| | | | | 244/121 |
| 7,467,496 B1 | * | 12/2008 | Cuisset | E04H 15/20 |
| | | | | 52/2.18 |
| 2002/0096599 A1 | * | 7/2002 | McDermott | B64B 1/08 |
| | | | | 244/25 |
| 2004/0074150 A1 | * | 4/2004 | Wycech | B62D 29/002 |
| | | | | 52/2.13 |
| 2007/0069077 A1 | | 3/2007 | Colting | |
| 2008/0276545 A1 | * | 11/2008 | Publicover | E04H 15/20 |
| | | | | 52/2.11 |
| 2012/0159866 A1 | * | 6/2012 | Brown | B64C 3/30 |
| | | | | 52/2.11 |
| 2012/0312919 A1 | * | 12/2012 | Heppe | B64B 1/00 |
| | | | | 244/30 |
| 2014/0158817 A1 | * | 6/2014 | Chambers | B64B 1/32 |
| | | | | 244/30 |

FOREIGN PATENT DOCUMENTS

| | | | | | |
|---|---|---|---|---|---|
| JP | | 2002002595 A | | 1/2002 | |
| WO | | 2011/154797 A2 | | 12/2011 | |
| WO | WO | 2012138215 A1 | * | 10/2012 | E04B 1/3205 |

\* cited by examiner

STRATOSPHERIC BALLOON HAVING IMPROVED COMPRESSIVE STRENGTH

RELATED APPLICATIONS

This application is a §371 application from PCT/EP2013/062356 filed Jun. 14, 2013, which claims priority from French Patent Application No. 12 55761 filed Jun. 20, 2012, each of which is herein incorporated by reference in its entirety.

TECHNICAL FIELD OF THE INVENTION

The present invention belongs to the field of structures. More particularly, the invention relates to a closed structure whose compressive strength is improved, without its mass being increased. One particular application of the invention is in the production of a stratospheric balloon.

BACKGROUND OF THE INVENTION

It is known that materials are generally stronger in tension than in compression. For example, a structure, such as a hollow tube of whatever size, which is loaded in tension, is simple to make, whereas an identical structure loaded in compression proves to be complex to make. Indeed, for a given dimension, making a structure able to withstand a compressive force generally leads in turn to a considerable increase in the mass of the structure. This increase in mass penalizes the design of compression-loaded architectures in numerous fields of industrial application, in particular in the field of aeronautics.

In order to illustrate an example, one can mention the case of current stratospheric balloons, that is to say those which fly in the stratosphere, that layer of Earth's atmosphere which begins, at temperate latitudes, at an altitude of approximately 20 km. These balloons are so-called drifting balloons, that is to say that it is difficult to stabilize their altitude over a plurality of diurnal and nocturnal cycles. This arises principally from the fact that, when such balloons are to be piloted, since their energy supply is entirely solar in origin, their mass equation does not converge. In other words, taking winds into account, the energy necessary to counteract the latter and maintain a geostationary position is too great and the consequence in terms of mass is too great for such balloons to be able to remain airborne at their cruising altitude for a whole year.

One solution to save on mass would consist in replacing the aerostatic gas (for example helium) contained in the balloon by a vacuum. For example, for a 23 000 m³ balloon, that would represent a not inconsequential saving of the order of 300 kg of helium. However, since the pressure at an altitude of 20 km is 54 hPa, the pressure force which would act on the current structure of the balloon would be too great. Currently, no structure which is sufficiently lightweight can withstand such a force.

OBJECT AND SUMMARY OF THE INVENTION

The use of structures whose compressive strength is improved without a penalty in terms of mass is therefore important for industrial applications, in particular for producing stratospheric balloons.

According to the invention, a three-dimensional structural framework comprises a plurality of inflatable rings, having, in an inflated state, along a plane passing through the axis of revolution of the ring, a T-shaped cross section, and a plurality of means for stabilizing the shape of the structural framework in space, two inflatable rings being connected by at least one shape-stabilizing means.

By virtue of their T-shaped cross section, the volume of the inflatable rings is less than that of inflatable rings of typically circular cross section, and their mass is therefore less, principally due to the fact that, at the same pressure of the internal fluid, the volume of the inflatable rings of T-shaped cross section is smaller. Calculations which are within the capabilities of one skilled in the art will show that the inflatable rings of T-shaped cross section nonetheless remain just as strong with respect to the same pressures as the inflatable rings of circular cross section.

The inflatable rings are preferably inflated using air, but may be inflated using any other fluid whose mass is substantially equal to that of air.

The shape-stabilizing means are arranged between the inflatable rings so as to prevent deformation of the shape of the structural framework in space, under the effect of external pressure forces acting on said structural framework 10.

The structural framework according to the invention thus has a shape allowing it to withstand external pressure forces acting on it.

The structural framework is advantageously intended for the production of stratospheric balloons.

According to preferred embodiments, the invention also corresponds to the following features, implemented separately or in each one of their technically operable combinations.

In preferred embodiments of the invention, so as not to increase the weight of the structural framework, a means for stabilizing the shape of the structural framework in space is a rigid element.

Rigid is understood as an element whose shape and dimensions do not change substantially when the structural framework is used.

In preferred embodiments of the invention, a means for stabilizing the shape of the structural framework in space is an inflatable ring, having a T-shaped cross section in the inflated state.

In preferred embodiments of the invention, at least two adjacent inflatable rings each have an internal volume, wherein said at least two internal volumes communicate with each other.

In a preferred embodiment, all the inflatable rings, adjoining one another at least two by two, each have an internal volume, wherein all the volumes communicate with each other.

The term "adjoining" is understood as meaning that two inflatable rings are in contact with one another.

In preferred embodiments of the invention, an inflatable ring has an internal volume divided into two independent chambers which are inflated/deflated selectively with respect to one another.

The invention also relates to a stratospheric balloon. Said stratospheric balloon comprises a structural framework as defined hereinabove in one of its embodiments and a skin stretched over the structural framework, said skin being taut when the inflatable rings of said structural framework are in an inflated state.

The stratospheric balloon thus produced is a closed structure, and is therefore able to contain a vacuum, between the inflatable rings, and its shape makes it able to withstand high external pressures, of the order of at least 50 hPa, while maintaining an acceptable mass. Typically, and by way of comparison, for a current 23 000 m³ stratospheric balloon of total mass 2 tonnes, at an altitude of 20 km, the mass of the structural framework necessary to withstand the pressure would be of the order of 4 T, such that the balloon could not be built, whereas a stratospheric balloon according to an embodiment of the invention, which would contain a vacuum and be of a toroidal shape, and still having a total mass of 2 tonnes, would see the mass of the structural framework drop to approximately 600 kg.

BRIEF DESCRIPTION OF THE DRAWINGS

The invention will now be described more precisely within the context of entirely non-limiting preferred embodiments, represented in FIGS. 1 to 4, in which.

DETAILED DESCRIPTION OF THE EMBODIMENTS

The invention will now be described in the non-limiting case of a stratospheric balloon 1.

Figure 1:
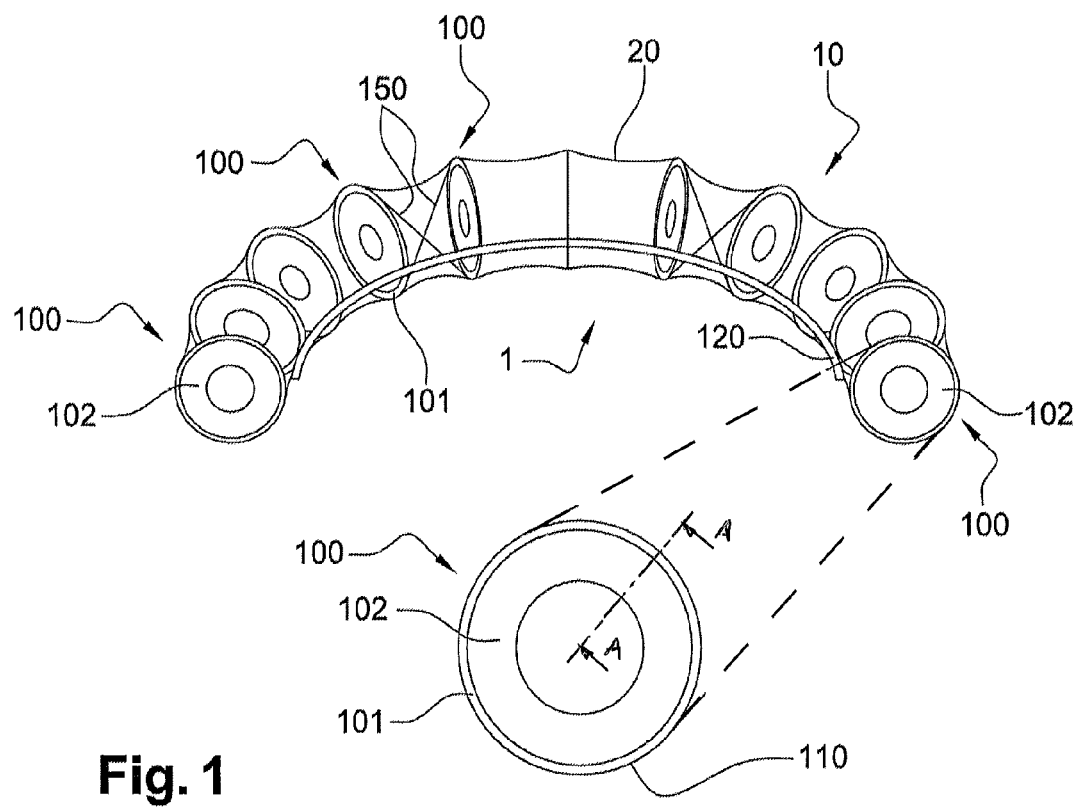
FIG. 1 illustrates a perspective view of part of an example of a stratospheric balloon represented in the form of a torus, created from a plurality of inflatable rings, in a first exemplary arrangement, and an enlargement of a transverse section of the torus.
Figure 2:
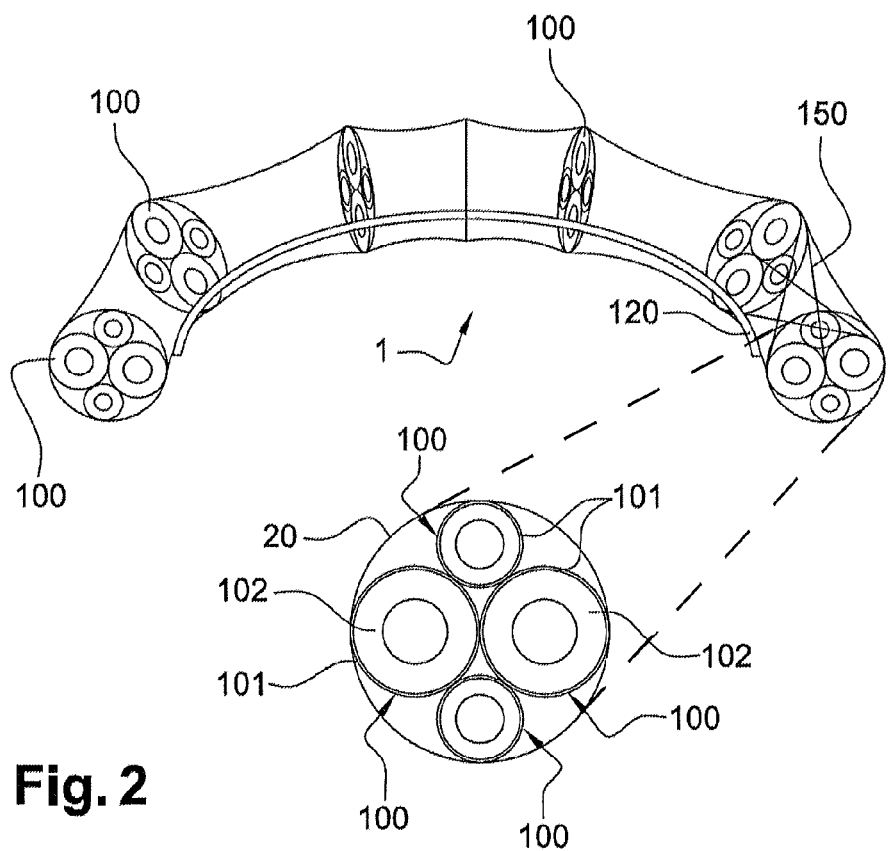
FIG. 2 illustrates a perspective view of part of an example of a stratospheric balloon represented in the form of a torus, created from a plurality of inflatable rings, in another exemplary arrangement, and an enlargement of a transverse section of the torus.
Figure 3:
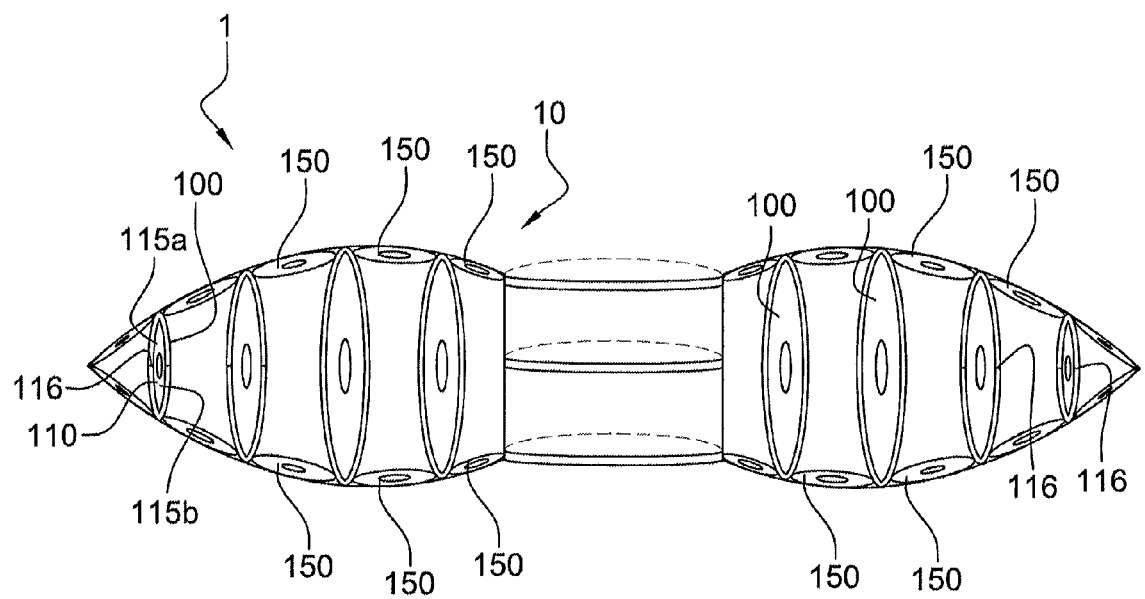
FIG. 3 illustrates a perspective view of part of an example of a stratospheric balloon represented in a lenticular form, created from a plurality of inflatable rings, in another exemplary arrangement.

FIGS. 1 and 2 describe two examples of a toroidal stratospheric balloon. FIG. 3 describes an example of a lenticular stratospheric balloon.

The stratospheric balloon 1 comprises:
  a structural framework 10 in a three-dimensional space, comprising:
    a plurality of inflatable rings 100,
    a plurality of means 150 for stabilizing the shape of the structural framework 10 in space,
  a skin 20 stretched over the structural framework 10.

In the example of FIGS. 1 and 2, for the sake of clarity, a half-torus is represented. In FIG. 1, only eleven inflatable rings 100, in an inflated state, and four shape-stabilizing means are illustrated. In FIG. 2, twenty-eight inflatable rings 100, in an inflated state, and four shape-stabilizing means are illustrated.

An inflatable ring 100 is preferably circular and has an internal volume 110.

The inflatable ring 100 is inflated by the introduction of a fluid into its internal volume 110. Preferably, the inflatable ring 100 is inflated using air, the density of this being low (1.204 kg/m$^3$ at 20° C.), but it is also conceivable to fill it with another fluid such as helium, of substantially lower density, hydrogen or even methane.

In one embodiment of the inflatable ring 100, the inflatable ring 100 is created from a structure of criss-crossed threads, of the woven grid type, whose mesh is chosen so as to withstand the internal pressure forces. The structure is covered with a coating which acts as a barrier to the internal inflation fluid.

In another embodiment of the inflatable ring 100, said inflatable ring 100 has a structure of criss-crossed threads, of the woven grid type, into which are injected polymer vapors which deposit on the structure and polymerize in the form of a very thin film so as to seal open portions of the structure of criss-crossed threads.

In the two preceding embodiments, the structure of criss-crossed threads comprises for example aramid threads, such as Kevlar®.

Figure 4:
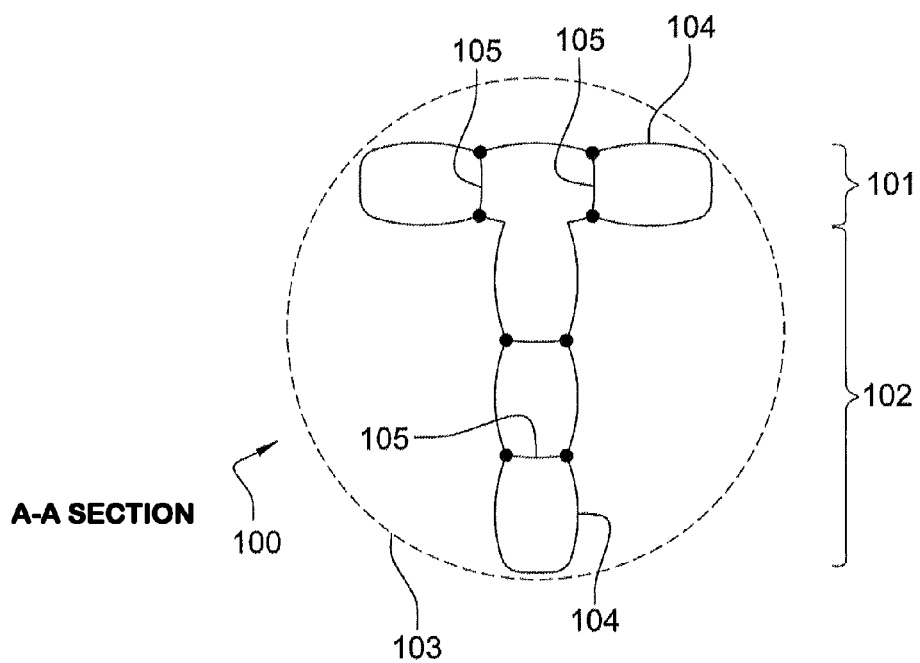
FIG. 4 illustrates a transverse section through a ring in the inflated state, illustrating its T-shaped cross section.
Figure 5:
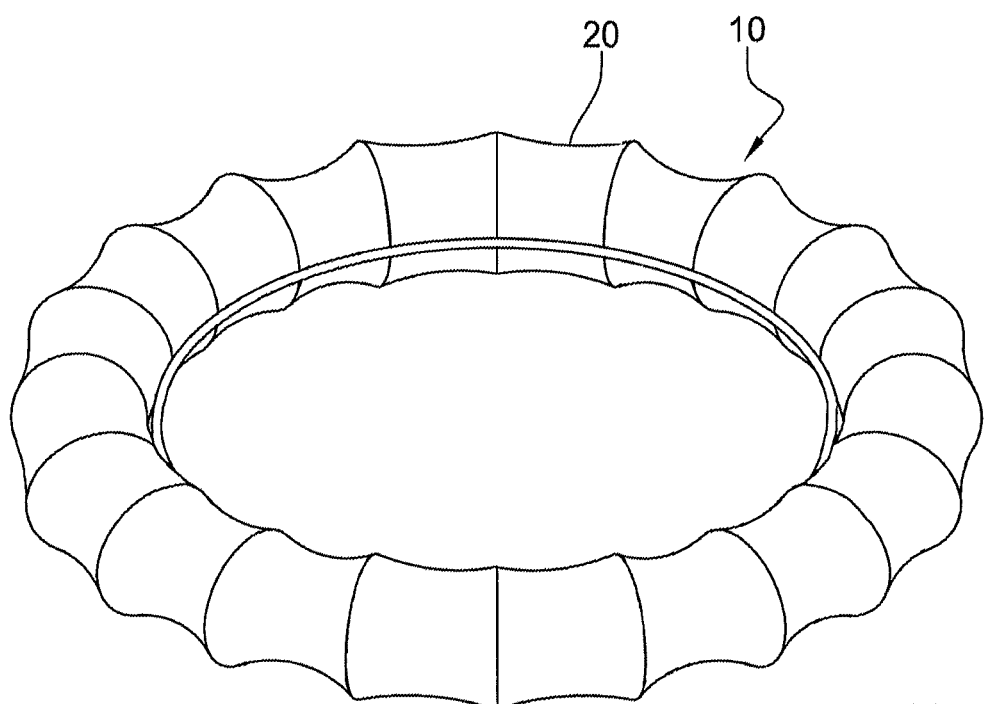

In an inflated state, the inflatable ring 100 has, in a plane passing through an axis of revolution of the inflatable ring 100, a T-shaped cross section, with a head 101 and a foot 102, as illustrated in FIG. 4.

In order to obtain a T-shaped cross section, the inflatable ring 100, initially generally of circular or oval cross section 103, as illustrated by a dashed line in FIG. 4, is deformed into a T shape by sewing or stitching with threads, for example made of Kevlar®.

Advantageously, such a cross section of an inflatable ring 100 permits, with respect to a conventional circular or oval cross section of an inflatable ring, a better compressive strength for a smaller inflated internal volume and thus a smaller mass.

The foot 102 of the T is preferably as long as possible. The length of the foot 102 depends on the external pressure exerted on the inflatable ring 100, it being known that, generally, the longer the foot of the T, the stronger it is with respect to the exerted external pressure.

The head 101 advantageously permits an increased contact surface between the inflatable ring 100 and the skin 20. In one dimensioning example, the width of the head is substantially equal to a thickness of the foot 102 of the T.

The present invention is not limited to the example of an inflatable ring 100 having a T-shaped cross section, as has been described and illustrated. A person skilled in the art will be able to adapt the invention to cross sections of the inflatable ring 100 which have not been described and which make it possible to withstand the pressure in a minimum volume, that is to say a fluid mass in the internal volume 110 at least equivalent to that of the inflatable ring 100 of T-shaped cross section.

In one example of a cross section, an I-shaped cross section may be envisaged.

In one embodiment of the inflatable ring 100, as illustrated in FIG. 3, the internal volume 110 of the inflatable ring 100 is divided into two independent chambers 115. The two independent chambers 115 are inflated and/or are deflated selectively with respect to one another, for example by means of a valve 116. In the example of FIG. 3, the volume is divided into two chambers, one "upper" chamber 115a and one "lower" chamber 115b. Thus, when the stratospheric balloon 1 is to be slowly brought back down, one solution would consist in deflating the lower chamber 115b of several inflatable rings 100, allowing the balloon to descend in the manner of a parachute.

In one embodiment of the structural framework 10, two adjacent inflatable rings 100 are connected by at least one shape-stabilizing means 150, each shape-stabilizing means 150 being connected, at two opposite ends 201, to two inflatable rings 100.

The shape-stabilizing means 150 are arranged so as to prevent any deformation of the shape of the structural framework 10 in space, under the effect of external pressure forces exerted on said structural framework 10.

The shape-stabilizing means 150 also ensure the mechanical stability of the structural framework 10.

Choosing the number of shape-stabilizing means and positioning them between the plurality of inflatable rings 100, so as to prevent, in the plane, any deformation of the shape of the structural framework 10 under the effect of exerted external pressure forces, is within the capabilities of one skilled in the art.

In a first embodiment of shape-stabilizing means 150, as illustrated in FIGS. 1 and 2, said shape-stabilizing means is an inextensible element.

An inextensible element is understood as an element which exhibits zero or near-zero deformation for the forces which the structural framework 10 will have to withstand.

In one exemplary embodiment, an inextensible element is an inextensible thread, by means of which it is possible not to weigh down the structural framework 10.

This inextensible thread is made, for example, from materials such as aramid, for example a Kevlar® thread having very good mechanical properties in tension (breaking strength of the order of 3100 MPa and Young's modulus between 70 and 125 GPa) and fatigue properties, or a composite, for example a carbon thread having a tensile strength of the order of 7000 MPa and a Young's modulus of the order of 520 GPa.

In another exemplary embodiment, the inextensible element is a rigid element, that is to say an element whose shape and dimensions experience no substantial changes while the structural framework 10 is in use. This rigid element forms a spacer, that is to say it makes it possible to maintain a constant separation between the inflatable rings 100 to which it is connected.

In the example of FIG. 1, two inflatable rings 100 are connected by two inextensible elements.

In a second embodiment, illustrated in FIG. 3, a means 150 for stabilizing the shape of the structural framework 10 in space is an inflatable ring 100, or a portion of an inflatable ring, of T-shaped cross section in the inflated state.

The inflatable rings 100 are connected such that the internal volumes of at least two adjacent inflatable rings 100 communicate with one another and such that the same fluid circulates in the internal volumes and inflates them.

Preferably, the inflatable rings 100 are configured such that the internal volumes of all the inflatable rings 100 communicate with one another such that the same fluid circulates in all the internal volumes and inflates them. Thus, only a single inlet is required to inflate the structural framework 10.

The skin 20 is chosen so as to be strong enough not to rupture under the external pressure forces.

The skin is configured so as to be taut when all the inflatable rings 100 which constitute the structural framework 10 are in the inflated state.

In one example of the skin 20, the skin 20 comprises an air-tight membrane and a structure of criss-crossed threads, of the grid type, whose mesh is chosen so as to withstand the external pressure forces.

Preferably, the membrane is made of a material such as ethylene tetrafluoroethylene (ETFE).

Preferably, the membrane is made of a transparent material.

A "transparent material" is understood as a material through which solar and infrared radiation can pass, with minimum absorption. This material may in particular consist of polyethylene or polyester, which are the materials generally used to make stratospheric balloons.

Preferably, the structure of criss-crossed threads comprises for example at least one thread made of a material chosen from among the following: metal, aramid such as Kevlar®, carbon, etc.

In the example illustrated in FIG. 1, the skin 20 is stretched over an external peripheral contour of each inflatable ring 100.

A contour of an inflatable ring 100 is formed by an external surface of the head of the T.

In the example illustrated in FIG. 2, the skin 20 is stretched over only part of the external surface 104 of the head 101 of the T.

In the embodiment of the torus of FIGS. 1 and 2, said torus further comprises a rim 120.

In one exemplary embodiment of the rim 120, said rim being loaded in compression, the rim 120 consists of a chain connecting a plurality of successive inflatable rings 100 to each other, preferably, but in a non-limiting manner, of T-shaped cross section.

The components of the structural framework 10 (that is to say the inflatable rings 100 and the means 150 for stabilizing the shape of the structural framework 10 in space), possibly the rim if present, by virtue of their natures and their shapes, are chosen such that the stratospheric balloon withstands external pressure forces of the order of at least 50 hPa, the individual load depending on the shape of the stratospheric balloon and on the number of inflatable rings 100 placed to create it while keeping to an acceptable mass.

In the case of the application to the stratospheric balloon 1, it may advantageously be envisaged to fill the internal volume of the stratospheric balloon, between the inflatable rings 100, with a vacuum. The total weight of the stratospheric balloon is thus considerably reduced.

The present invention is not limited to toroidal or lenticular stratospheric balloons. A person skilled in the art will be capable of adapting the invention to shapes which have not been described, for example a spherical shape, or a non-axisymmetric toroidal shape.

The above description clearly illustrates that, by virtue of its various features and their advantages, the present invention achieves the objects set. In particular, it proposes a closed structure having a shape, by way of a structural framework, which withstands the compressive forces acting on it, without implying a penalty for the weight of the structure.

The invention claimed is:

1. A stratospheric balloon, comprising:
    a three-dimensional structural framework, comprising a plurality of inflatable circular rings, each inflatable circular ring having a T-shaped cross section in an inflated state;
    a skin on the structural framework, the skin being taut in the inflated state of the inflatable circular rings of the structural framework;
    a plurality of shape-stabilizing elements to stabilize a shape of the structural framework in space; and
    wherein two inflatable circular rings are connected by at least one shape-stabilizing element.

2. The stratospheric balloon as claimed in claim 1, wherein one shape-stabilizing element is a rigid element.

3. The stratospheric balloon as claimed in claim 1, wherein one shape-stabilizing element is an inflatable circular ring having a T-shaped cross section in the inflated state.

4. The stratospheric balloon as claimed in claim 1, wherein at least two of the plurality of inflatable circular rings are adjacent and each of the adjacent inflatable circular rings have an internal volume and the internal volumes communicate with each other.

5. The stratospheric balloon as claimed in claim 4, wherein each inflatable circular ring has an internal volume and all the internal volumes communicate with each other.

6. The stratospheric balloon as claimed in claim 1, wherein one inflatable circular ring has an internal volume divided into two independent chambers which are inflated or deflated selectively with respect to one another.

7. A stratospheric balloon, comprising:
- a structural framework comprising a plurality of inflatable rings, each inflatable ring having a T-shaped cross section in an inflated state; a plurality of shape-stabilizing elements to stabilize a shape of the structural framework in space;
- a skin on the structural framework, the skin being taut in the inflated state of the inflatable rings of the structural framework; and
- wherein two inflatable rings are connected by at least one shape-stabilizing element.

* * * * *